United States Patent [19]
Daimon et al.

[11] 3,936,383
[45] Feb. 3, 1976

[54] SOL OF ULTRA-FINE PARTICLES OF SYNTHETIC HECTORITE

[76] Inventors: Nobutoshi Daimon, No. 195-112, Aza Kanda, Mikuriya, Kawanakajima-cho, Nagano, Nagano Prefecture; Toichiro Izawa, No. 25-26, Koganekara 7-chome, Matsudo. Chiba Prefecture, both of Japan

[22] Filed: May 6, 1974

[21] Appl. No.: 467,565

[30] Foreign Application Priority Data
May 14, 1973 Japan.................. 48-52531

[52] U.S. Cl. ............... 252/63; 252/63.2; 252/63.5; 252/313 S; 252/309; 106/74; 423/326; 423/331; 260/37 M; 427/372; 427/201 S
[51] Int. Cl.$^2$. B01J 13/00; H01B 3/02; C01B 33/20
[58] Field of Search ......... 423/326, 331; 252/313 S, 252/313, 63, 63.5; 106/74

[56] References Cited
UNITED STATES PATENTS
3,666,407   5/1972   Orlemann ..................... 423/331
3,671,190   6/1972   Neumann ..................... 423/331

OTHER PUBLICATIONS

Granquist et al., "A Study of the Synthesis of Hectorite", Mellon Inst., Pitts., Pa. (1969).

*Primary Examiner*—John D. Welsh
*Attorney, Agent, or Firm*—Wenderoth, Lind & Ponack

[57] ABSTRACT

This invention relates to a sol of ultra-fine particles of synthetic hectorite prepared by swelling and cleaving Li-hectorite having a formula of $Li_{1/3}Mg_{2-2/3}Li_{1/3}(Si_4O_{10})F_2$ or Na-hectorite having a formula of $Na_{1/3}Mg_{2-2/3}Li_{1/3}(Si_4O_{10})F_2$ in water or an organic solvent.

This invention further relates to a sol of the above hectorite in which Li or Na ions co-ordinated between lattice layers of the hectorite are ion-exchanged with non-hydratable cations.

This invention still further relates to a product prepared by using the above sol.

5 Claims, No Drawings

SOL OF ULTRA-FINE PARTICLES OF SYNTHETIC HECTORITE

DETAILED EXPLANATION OF THE INVENTION

This invention relates to a sol of synthetic mineral layered (lamellar) structure material, and to a film or a coating composition prepared by the use of the sol.

According to mineralogy, a silicate mineral having a layered structure includes naturally occurring kaolin type clay, mica, montmorillonite, talc, pyrophyllite, and artificially synthesized fluorine mica and the like. The crystal of a layered structure mineral generally has a three-layered lattice as a unit, which comprises two tetrahedron layers composed of O and Si disposed at upper and lower parts of the lattice and one octahedron layer composed of O and Al disposed at the center of the lattice (between the two tetrahedron layers). The various above cited minerals can be produced by replacing Si in the tetrahedron layer and Al in the octahedron layer with other elements such as Al, Mg and the like.

Some layered structure materials having strongly hydratable Na or Li co-ordinated between the unit layers or adsorbing Na or Li on the surface of the particle are able to swell by introducing hydration water between the unit layers and thus extending the distance between the unit layers. This swelling is caused by water as well as organic solvents. This swelling action cleaves a layered structure material into small particles composed of several unit layers or even into a molecular unit although this depends on the degree of the hydration.

By using this swelling action, it is possible to prepare a stable colloid of a layered structure material dispersed in water. A molded product prepared by drying this colloid without ion-exchange is easily re-hydrated by absorbing water and swelled again even in air because the molded product still has strongly hydratable Li or Na co-ordinated between unit layers. Therefore, in order to protect the molded product from being re-hydrated, it is necessary to ion-exchange the colloid or the molded product by bathing it in a solution containing other cations such as $K^+$, $Ag^+$, $Cu^+$, $Ba^{2+}$, $Pb^{2+}$, $Sn^{2+}$, $Zn^{2+}$, $Al^{3+}$, $Bi^{3+}$, and $Sb^{3+}$. The molded product thus ion-exchanged is not re-hydratable and has an excellent insulation resistance. Typical examples of the layer structure material having the above mentioned properties are naturally occurring montmorillonite and tetra-silicic mica.

A colloid of cleaved layered structure material is plastic, and has various uses. For example, an excellent heat-resistant and insulating film is prepared by coating this colloid having a suitable consistency on a substrate and drying it. Such a colloid alone or in combination with other powdery inorganic mineral may be molded into a desired shape. Further, this colloid may be admixed with suitable materials to use as a paint. Such a film-like product prepared by using a colloid of layered structure materials is flexible.

The reason why such a film-like product has flexibility is that when a colloid of cleaved layered structure material having a fine particle size (disk diameter) of less than 1,000 A is dried, the fine particles are self-bonded to each other by the action of Van der Waals molecular cohesion forces to form a flake-like particle having a thickness of 10–50 A and a particle diameter (disk diameter) of 100 to 1,000 times as large as the thickness, and these flake-like particles are elastic and disposed parallel with the film.

Naturally occurring montmorillonite is easily swellable, plastic and flexible, but its crystal structure is not uniform since it includes various impurities and ion-exchange with other cations is not completely carried out as co-ordination or adsorption of sodium is very complicated. Thus, an alkali dissociation, that is, a dissociation of sodium which is easily hydratable is not completely carried out, and therefore a dried product of montmorillonite is re-hydrated.

In place of the above mentioned defective montmorillonite, fluorine tetra-silicic mica having sodium co-ordinated between unit layers is now being used for making heat-resistant paper. The fluorine tetra-silicic mica known to be used at present includes sodium fluorine tetra-silicic mica having a formula $NaMg_{2.5}Si_4O_{10}F_2$ and its derivative of formula $NaMg_2LiSi_4O_{10}F_2$.

It is known that the conventional sodium fluorine tetra-silicic mica is hydratable and swellable since it has hydratable sodium elements co-ordinated between unit layers and its crystal lattice is tetra-silicic mica type. However, the detailed mechanism of the swelling is not clear. In connection with this, sodium fluorine tri-silicic mica ($NaMg_3AlSi_3O_{10}F_2$) is not swellable.

A stable colloid of sodium tetra-silicic mica is prepared by bathing a synthesized crystal mass in water to cleave the crystal mass into smaller particles. The particles thus obtained by swelling the conventional sodium tetra-silicic mica remains large, and the hydration stops at the stage of $NaMg_{2.5}Si_4O_{10}F_2$—$4H_2O$ in water. Therefore in order to make smaller particles, it is necessary to heat the particles to 300°–550°C 2 or 3 times thereby making fine particles by the inflation force of evaporation of the hydration water. Even after the above heat-treatment, the cleavage of the crystal mass is not completely carried out, and particles composed of more than 10 units of crystal pieces are still present. The particles obtained by cleaving the conventional sodium tetra-silicic mica are relatively easily crystallizable and have particle sizes varying from 1,000 A to 3–4 $\mu$. Consequently, the difference between buoyancy and electric repulsion is not uniform, and the particles are not dispersed uniformly in a medium.

The layered structure material of this invention is derived by ion-exchanging pyrophyllite-talc structure material. The pyrophyllite-talc structure was first lectured on by Pauling. Pyrophyllite has a structure a little different from those of kaoline and mica, but is a relative mineral. Pyrophyllite is expressed by a standard formula, $Al_2Si_4O_{10}(OH)_2$. This structure has silicic acid tetrahedron layers as upper and lower layers of the lattice and a space layer of octahedra surrounded by six anions, that is, 4 O and 2 (OH) as a middle layer of the lattice, and two-thirds volume of the space layer is occupied by Al whereby an electric equilibrium is maintained. This three-layered lattice is a unit layer, and many unit layers are piled in parallel. In respect of the structure of pyrophyllite, when $Si^{4+}$ in the silicic acid tetrahedron layer is replaced by $Al^{3+}$ and $Al^{3+}$ in the octahedron layer is replaced by $Mg^{2+}$, superfluous negative charges are developed in the three-layered lattice, and consequently $Ca^{2+}$ or $Na^+$ are co-ordinated between the three-layered lattices (or unit layers) adjacent to each other to neutralize and attain an electric equilibrium. Montmorillonite expressed by an ideal standard formula, $(Al_{1.67}Mg_{0.33})Si_4O_{10}(OH)_2$ has this ion-exchange system.

Generally, when strongly hydratable alkali metal cations such as Na are co-ordinated between unit layers, hydration water is introduced between the layers, and the distance between the layers extends whereby the crystal mass is swelled. Actually, however, naturally occurring montmorillonite as expressed by the above ideal standard formula cannot be obtained. A part of the aluminium ions is replaced by ferric ions and another part by siliconions. Between unit layers various cations including Na, Ca, Li and K are actually adsorbed, and therefore the swellability varies depending on the cations adsorbed. Thus, the various cations are adsorbed between unit layers, and therefore it is difficult to sufficiently ion-exchange these cations with non-hydratable cations to prevent re-hydration.

One object of this invention is to provide a sol of cleaved particles of a layered structure material, having a particle size of less than 1,000 A, characterized in that the layered structure material is a hectorite having a formula of $Li_{1/3}Mg_{2-2/3}Li_{1/3}(Si_4O_{10})F_2$ or $Na_{1/3}Mg_{2-2/3}Li_{1/3}(Si_4O_{10})F_2$.

Another object of this invention is to provide a product obtained by using the above sol alone or in combination with other materials.

The layered structure material, which is effectively swelled and cleaved, as used in this invention, must satisfy the following conditions.

a. The ion size of cations co-ordinated between unit layers should be small. A cation co-ordinated between unit layers is preferably $Li^+(0.60$ A$)$, $Na^+(0.98$ A$)$ or $Ca^{2+}(0.98$ A$)$ which all have smaller ion radiuses than that of $K^+(1.33$ A$)$. The smaller the ion size of a cation co-ordinated is, the more the energy level of the structure increases. Consequently, the structure becomes unstable, and requires the stabilization of energy by swelling.

b. The hydration energy of a cation to be co-ordinated between unit layers should be high. Examples of a cation having a high hydration energy are $Li^+$, $Na^+$, $Ca^{2+}$. The hydration energy of $Li^+$ is especially high. The relative hydration energy ratio between $Li^+$ and $Na^+$ is 14 : 8.

c. The valency of a cation to be co-ordinated between unit layers should be low, preferably monovalent. A cation having a high valency strengthens bonding between unit layers, and swelling is not sufficiently carried out since hydration water is hardly introduced between unit layers.

d. Ion-exchange with the same type of ion should not take place in silicic acid tetrahedra. The vacancy concentration at 12-co-ordinate position formed by oxygens laid between adjacent layers one another should be low. If a structure complies with this condition, the electric charge density on the surface of each silicic acid tetrahedron is low and consequently the bonding strength between unit layers is weak.

e. The solvent to be used for carrying out the cleavage should have a high dielectric constant.

Swellable layered structures which satisfy the above conditions include (i) $NaMg_2Li(Si_4O_{10})F_2$, (ii) $LiMg_2Li(Si_4O_{10})F_2$, (iii) $NaMg_2Li(Ge_4O_{10})F_2$, (iv) $LiMg_2Li(Ge_4O_{10})F_2$, (v) $Ca_{0.5}Mg_2Li(Si_4O_{10})F_2$, (vi) $Ca_{0.5}Mg_2Li(Ge_4O_{10})F_2$, (vii) $NaMg_{2.5}(Si_4O_{10})F_2$, (viii) $NaMg_{2.5}(Ge_4O_{10})F_2$ and (ix) $Ca_{0.5}Mg_{2.5}(Si_4O_{10})F_2$.

These layered structures (i) to (ix) are referred as taeniolite type synthetic micas, and their swellability by water is not uniform. The hydration reaction mechanism of a layered structure material having Na co-ordinated is quite different from that of a layered structure material having Li co-ordinated. A layer of hydration water having a hexagonal network of hydrogen bonds is introduced in 12-co-ordinated positions formed by oxygens laid between layers, and a fixed number of water layers are introduced between the layers in air or in water depending on the cations co-ordinated between the layers. A layered structure material having Na co-ordinated between layers is hydrated in water until $NaMg_{2.2}Li(Si_4O_{10})F_2$—$4H_2O$ is formed and hydration stops at this stage, while a layered structure material having Li co-ordinated between layers is hydrated in water until $LiMg_{2.2}Li(Si_4O_{10})F_2$—$20H_2O$ is formed, and further until the layer structure breaks down and loses some of its hydration water.

According to this invention, a major part of $Al^{3+}$ in an octahedron layer of pyrophyllite-talc structure is replaced by $Mg^{2+}(Mg_{2-1/3})$ and a minor part of the $Al^{3+}$ is replaced by $Li^+Li_{1/3})$, and Li or Na is co-ordinated between unit layers. The layered structure material thus prepared satisfies the above mentioned conditions (a) to (e) for swelling, and becomes highly swellable.

The novel layered structure material synthesized in accordance with this invention is expressed by the chemical formula, $Li_{1/3}Mg_{2-2/3}Li_{1/3}(Si_4O_{10})F_2$ or $Na_{1/3}Mg_{2-2/3}Li_{1/3}(Si_4O_{10})F_2$, and belongs to a hectorite type mineral. The layered structure of this invention may also be called Mg-F-montmorillonite, and is different from the conventional mica minerals. The novel layered structure material of this invention as expressed by the above formula has never been synthesized heretofore.

Thus, hectorite can be prepared by ion-exchanging talc $(Mg_3Si_4O_{10}(OH)_2)$ type structure. However, naturally occurring hectorite is obtained in a form of a mixture with other layered structure material, and a part of the Mg is ion-exchange with Fe and Mn. Consequently cleavage by swelling cannot uniformly be carried out, and it is impossible to produce fine particles by the cleavage. Uniform fine particles can be obtained only when the synthetic hectorite of this invention having a formula $(Li_{1/3}Mg_{2-2/3}Li_{1/3}(Si_4O_{10})F_2)$ or $(Na_{1/3}Mg_{2-2/3}Li_{1/3}(Si_4O_{10})F_2)$ is cleaved by swelling.

Materials to be used in synthesizing hectorite in accordance with this invention include highly pure magnesia (MgO), silica ($SiO_2$), lithia ($Li_2O$), sodium oxide ($Na_2O$), magnesium fluoride ($MgF_2$), lithium fluoride (LiF), sodium fluoride (NaF) and the like.

The hectorite of this invention is synthesized in the following manner. The above materials are ground to particles of smaller than 100 mesh, and are mixed in a mole ratio corresponding to $Li_{1/3}Mg_{2-2/3}Li_{1/3}(Si_4O_{10})F_2$ or $Na_{1/3}Mg_{2-2/3}Li_{1/3}(Si_4O_{10})F_2$, for example, in a mol ratio of ½–⅙$Li_2O$ : 1–1⅓$MgF_2$ : 1–⅔MgO : 4$SiO_2$ or ⅔–1LiF : ⅔–1$MgF_2$ : 2MgO : 4$SiO_2$ in the preparation of Li-hectorite, or in a mol ratio of ⅓–2/5LiF: ⅓–2/5NaF : ⅔–1$MgF_2$ : 2MgO : 4$SiO_2$ or 1/6–1/5$Li_2O$ : 1/6–1/5$Na_2O$ : 1–1⅓$MgF_2$ : 1⅔MgO : 4$SiO_2$ in the preparation of Na-hectorite.

When an "externally heating process" is employed, the mixture is placed in an alkali-resistant crucible of alumina, graphite, silicon carbide, beryllia, platinum or the like. The mixture in the crucible is heated at 1,300°C in an electric furnace or cupola furnace to carry out a solid reaction, and further heated to more than 1,350°C to melt the mixture. When the melt is cooled thereafter, Li-hectorite or Na-hectorite as expressed by the above formulas is obtained.

When an "internally heating process" is employed, the mixture is placed in an open furnace having a fireproof wall on the inside, and a pair of inactive electrodes such as graphite are embedded in the center of the mixture. First, the two electrodes are short-circuited in a carbonaceous resistance thereby melting the mixture of the materials around the carbonaceous resistance. The melt of the mixture is conducting, and has a resistance value of 2–5Ω. Then the carbonaceous resistance is removed at an appropriate time, and the melt of the mixture is thereafter used as a resistance for further melting the mixture around the melt. In connection with this, the mixture around the melt forms a shell of sintered material and works as a lining. Accordingly, it is not necessary to worry about the corrosion by alkali.

The crystal mass of the hectorite thus formed becomes fragile even in air by absorbing moisture, and is then decomposed to small particles having a diameter of less than 5 mm. The decomposition (i.e. cleavage) is further accelerated in steam. The decomposed or cleaved small particles are then dipped in water or hot water to further decompose the particles. The crystal mass may be dipped in water as soon as it is formed.

According to the above-mentioned swelling mechanism, the crystal mass is cleaved to very fine particles by strongly hydrating the crystal to introduce a large amount of water between the layers thereby extending the distance and splitting electrostatic bonds between the layers.

A sol having the above fine particles of hectorite stably suspended in water in an amount of less than 10% is prepared, and glassy impurities formed in the synthesis of the hectorite are allowed to precipitate on the bottom of the vessel and are then removed from the sol. The sol without containing the impurities is used for making various products. According to the measurement by an electromicroscope, the fine particles suspended in the sol are scaly and have an average thickness of less than 20 A and an average particle diameter of less than 500 A. These ultra-fine particles provide a strong molecular cohesive force and mechanical strength when a sol of the ultra-fine particles is formed into a product and dried. However, a product prepared by using the sol of these particles still having hydratable Li or Na between layers is easily rehydrated and swelled. In order to avoid the re-hydration, it is necessary to replace the hydratable Li or Na by less hydratable or non-hydratable cations such as $K^+$, $Ba^+$, $Ag^+$, $Cu^+$, $Pb^{2+}$, $Zn^{2+}$, $Sn^{2+}$, $Al^{3+}$, $Sb^{3+}$, $Bi^{3+}$ or the like. This ionexchange is carried out by using the salts $KCl$, $Ba(NO_3)_2$, $AgNO_3$, $CuSO_4$, $Pb(NO_3)_2$, $ZnCl_2$, $SnCl_2$, $Al(NO_3)_3$, $SbCl_2$, $Bi(NO_3)_3$ or the like. Salts of organic acids may also be used.

The ion-exchange may be carried out either in the sol state or after forming it into a product. In the ion-exchange of a sol, 150–200 g of one of the above salts is added to 3 liters of a sol containing the synthetic hectorite in an amount of 1–5%, and the ultra-fine particles of the synthetic hectorite are then flocculated. The ion-exchange is carried out for 50 to 100 hours with stirring the cohered hectorite particles and dispersing them so that they are slurry-like. After the ion-exchange, the suspension is filtered under a vacuum and the filtrate is removed. The material remaining on the filter plate is washed with water until $Li^+$, $Na^+$ and the above electrolite used for the ion-exchange are completely removed. The material remained on the filter plate is partially cohered flocky, but a stable sol having ultrafine particles of the hectorite dispersed in it is obtained by vigorously stirring the sol with ultrasonic waves. The dissociated ions may be removed by an electrodialysis technique.

The sol thus prepared can be used as a coating composition, paint, bonding agent or the like for a metal product and the like, and provides a wet-proof, heat-resistant and insulating film on the product.

As mentioned above, the ion-exchange for preventing re-hydration may be applied to a sol in advance or to a product later. The ion-exchange of a product may be carried out by dipping the product in a solution of the above-mentioned salt for 50 to 200 hours depending on the thickness of the product; washing the ion-exchanged product by allowing it to stand in water; drying the washed product in air for 5 to 10 hours; and further drying it in a drier at 100°–300°C.

A film is one of the important products which can be prepared by using the Li-hectorite or Na-hectorite of this invention. A hectorite particle in a sol is charged negative on its flat surface and positive at its end. Consequently while the sol of the hectorite is coated on a flat plate and dried, the flat face of the hectorite particle is electrostatically bonded with the end of another particle. In this manner, a film having hectorite particles intimately overlapping each other is obtained. In the preparation of a film, a sol containing hectorite in an amount of less than 10% is used, and the sol is applied to a plate or product by a spread-coating method using a centrifuge; a spray-coating method using a compressor or electrostatic technique; or a flow-coating method.

The film thus prepared which comprises the hectorite of this invention alone has a tensile strength of 2 $kg/mm^2$. A film which is prepared by using the hectorite in combination with 5–10% of inorganic fibers such as glass fiber, silica, mullite, alumina and the like has a tensile strength of 5–7 $kg/mm^2$.

The ion-exchanged synthetic hectorite particles of this invention are negatively charged on the flat surface, and therefore hectorite particles are closely adhered in parallel to a metal surface of an article. By using this characteristic of the hectorite of this invention, a coating composition which provides excellent heat-resistant and insulating properties is prepared by mixing the hectorite sol with 5–20% of viscous material comprising a mixture of phosphoric acid with an inorganic gel such as silica gel, alumina gel or the like. The flat surface of the scaly hectorite particle is electrostatically bonded with the end of another hectorite particle, and the reaction product of the inorganic gel and phosphoric acid fills the gaps between the overlapped scaly hectorite particles. Thus, a strong and dense film is firmly adhered to an article. The coating composition of this invention is applied not only to a metal surface but also to other materials.

The synthetic Li-hectorite or Na-hectorite of this invention may also be used in combination with organic materials. The combination of the ion-exchanged synthetic hectorite with organic material is not a mere mixture but an organic solvent invades between layers to produce a solvated or base-exchanged hectorite.

Organic materials having a high dielectric constant, which are suitable for preparing a solvated hectorite, include amides, amines and glycols, for example, formamide, ethyleneglycol, 2-naphthylamine, glycerol, piperidine and the like. A polar amino-acid or the like is suitable for preparing a base-exchanged hectorite by ion-exchanging Li or Na co-ordinated between layers.

A sol of synthetic hectorite in which Li or Na co-ordinated between layers is replaced by other cations is condensed by evaporation until the water content of the sol becomes less than 10%. The condensed sol is bathed in the above organic solvent thereby having the organic solvent invade between layers. The resultant solution is a lipophilic viscous material. This lipophilic viscous material is used in combination with pigment as a paint, or it is used in combination with oil as a lubricant.

When a sol of hydrated hectorite particles is mixed with a organic solvent, the hydrated water co-ordinated between layers of the hectorite is replaced by the organic solvent. For example, a condensed sol of hectorite having a water content of 10% is mixed with 200–300% of an organic solvent such as acetone, benzol, xylol or the like in the presence of 0.5–1% of a cationic surface-active agent with stirring, and the hydration water co-ordinated between layers is replaced by the solvent while the mixture is being mildly stirred.

The sol of the hectorite particles of this invention is used in combination with a varnish type synthetic resin in the presence of 0.5–1% of a surface-active agent to prevent charging with electricity to produce a plastic material. I.e., when the coating composition containing the hectorite particles and the resin (less than 40%) is dried by evaporation, a large amount of scaly hectorite particles are intimately overlapped in parallel, and a firmly adhered strong coating material having heat-resistant and insulating properties is obtained. In the same manner, a heat-resistant and insulating paper is prepared by coating the above coating composition on a substrate and peeling the resultant film off the substrate.

The above composition containing hectorite and resin may also be used for preparing an article of desired shape by employing an injection molding or casting technique.

Any type of synthetic resins may be employed in combination with the hectorite of this invention, provided that they are water-soluble or diluted with solvent.

Another characteristic of the hectorite of this invention is that it is thixotropic. That is, when a sol containing more than 10% of the hectorite is allowed to stand for a predetermined period of time, it is gelled to a solid, but such a gel easily returns to a sol again by applying a shear stress to the gel. Due to this thixotropic property, a mixture of the hectorite sol with ceramic minerals or organic materials is easily stirred by a mechanical means, and when the stirring is stopped, the hectorite sol having the ceramic minerals or organic materials uniformly dispersed is gelled to a solid thereby preventing the ceramic minerals or organic materials from precipitating or floating on the surface.

Thus, by using this thixotropic property, organic fibers such as pulp, wood fiber, synthetic fiber, flax and cotton; inorganic fibers such as glass fiber, rockwool, silica, alumina and mullite; ceramic minerals such as calcium carbonate, silica and clay; and a combination thereof may be mixed with the hectorite of this invention in an amount of 60–70% to produce an intimate mixture. Such a mixture may be dried until the moisture content of the mixture becomes about 3%, and molded into a product under a pressure. When untreated (not ion-exchanged) hectorite is used, the mixture is further dried to remove water content, and is ion-exchanged. The ion-exchanged mixture may be molded into a desired shape.

Still another characteristic of the hectorite of this invention is that it can be activated. That is, as mentioned above, the hectorite of this invention has Li or Na co-ordinated between layers, which can be ion-exchanged with other cations, and in the same manner Li or Na ions can be replaced by hydrogen so that the hectorite can be acidic and active. According to Hofmeister's series ($H^+ > Al^{3+} > Ba^{2+} > Sr^{2+} > Ca^{2+} > Mg^{2+} > NH^+_4 > K^+ > Na^+ > Li^+$), $H^+$ is more easily adsorbed than other cations in the ion-exchange. The adsorption of $H^+$ on the hectorite is carried out by electrolysis in a weakly acidic solution. $H^+$ developed in the electrolysis is selectively adsorbed between layers of the hectorite. The adsorption of hydrogen ions is more preferably carried out by employing an electrodialysis technique since the purification of the hectorite also takes place at the same time. As another method, hydrogen ions may be adsorbed by bathing the hectorite in an acid solution such as HCl, $H_2SO_4$ or the like.

The above prepared hectorite having hydrogen between layers is called "hydrogen-hectorite (H-hectorite)". H-hectorite is useful since the hydrogen ion therein ion-exchanges with polar organic ions and other cations. In the preparation of H-hectorite by using acid, a treating solution should have a pH value of 1–2 because a stronger acid leaches even Mg or Li out from an octahedron-layer of the crystal lattice of the hectorite. However, when H-hectorite is used as a catalyst, an imbalance in electric charges is required for it to be active, and therefore H-hectorite in which a small amount of Mg or Li is leached out is sometimes preferable depending on the use.

As mentioned above, an object of this invention is to provide a synthetic Li-hectorite or Na-hectorite which is easily swellable and cleaved into ultra-fine particles, and to prepare various products by using the cohesive force and ion-exchange capacity of the ultra-fine particles.

This invention is further illustrated by the following Examples.

EXAMPLE 1

Lithium oxide (2.62% by weight), magnesium fluoride (18.46% by weight), magnesium oxide (17.7% by weight) and silicic acid (63.22% by weight) were mixed in a dry powdery state to prepare 102 kg of mixture, and the mixture was intimately stirred in a ball mill for one hour. The resultant mixture was placed in an open electric furnace of 50 × 50 × 100 cm, the inside of which was lined with SK 32 fire-brick. Two graphite electrodes having a branch electrode of 7 cm² were embedded in the center of the mixture, and the two graphite electrodes were disposed at counter positions by making the distance between the two electrodes 15 cm. The branch electrodes were short-circuited with graphite powder, and the mixture was melted in the first 15 minutes after turning on an electric current by the resistance heat of the graphite powder. The graphite powder disappeared by combustion. The melting of the mixture was continued for 3 hours by using the melted mixture as a pyrogen, and the melt of the mixture was allowed to stand for 10 hours to obtain 25 kg of a crystal mass of synthetic Li-hectorite ($Li_{0.33}Mg_{2.67}Li_{0.33}(Si_4O_{10})F_2$).

This crystal mass was dipped in a tank containing 150 liters of distilled water, and the crystal mass was decomposed into a thick slurry by a swelling phenomenon in five hours. While mildly stirring the slurry for one hour, the slurry was dispersed in water in a uniform density, and glassy impurities and other impurities formed in the above melting step were deposited on the bottom of the tank. The Li-hectorite dispersion was poured into another tank containing 100 liters of distilled water without including the deposited impurities. The resultant dispersion was heated at 80°–90°C with mild stirring, and was concentrated to obtain a uniform sol until the solid amount of Li-hectorite became 9–10%. The yield of the synthesized Li-hectorite sol was about 95%. According to a measurement by an electron microscope, the Li-hectorite dispersed in the state of sol had a thickness of 20–50 A and a particle size of 200–800 A.

EXAMPLE 2

Sodium fluoride (3.7% by weight), lithium fluoride (2.3% by weight), magnesium fluoride (10.8% by weight), magnesium oxide (20.9% by weight), and silicic acid (62.3% by weight) were mixed in a dry powdery state to prepare 5 kg of mixture. The mixture was placed in a crucible made from silicon carbide having a lid also made from silicon carbide. The crucible was then heated in a combustion flame of fuel oil for 2 hours. The mixture in the crucible was melted at 1,350°C, and thereafter 4.7 kg of a crystal mass of $(Na_{0.33}Mg_{2.67}Li_{0.33}(Si_4O_{10})F_2)$ was obtained. The crystal mass was then placed on a wire netting of 40 mesh, and collapsed into small pieces having a diameter of up to 5 mm in 2 hours on the wire netting when steam was contacted with the crystal mass through the bottom of the wire netting. The collapse pieces of the crystal mass were placed in a tank containing 50 liters of distilled water, and were mildly stirred to disperse the crystals in water. The crystal dispersion was poured into another tank containing 50 liters of distilled water, and was stirred at room temperature for 2 hours to obtain 80 liters of sol containing 5% of synthesized Na-hectorite. The Na-hectorite dispersed in the sol state had a thickness of 10–50 A and a particle size smaller than 800 A.

EXAMPLE 3

1,250 cc of sol containing 10% of synthesized Li-hectorite prepared in Example 1 was poured into a stainless steel pan of 50 cm × 50 cm having a thickness of 2 mm and having a frame, the surface of the pan being coated with silicone varnish. The pan was shaked horizontally to make the depth of the sol uniformly 5 mm, and the sol was dried in an atmosphere of a relative humidity of 50% at 20°C for 10 hours. The sol was then further dried in a drier at 100°C for 2 hours to obtain a film of 500 mm × 500 mm × 0.2 mm. The above prepared films were respectively dipped in the following solutions in enameled containers to carry out a cation-exchange. That is, the films were respectively dipped in KCl saturated solution for 70 hours; $Ba(NO_3)_2$ saturated solution for 70 hours; $Zn(NO_3)_2$ saturated solution for 70 hours; $AlCl_3$ saturated solutions for 70 hours; 20% $Pb(C_2H_3O_2)_2$ solution for 24 hours; 20% $Bi(NO_3)_3$ solution for 50 hours; and 20% $SbCl_3$ solution for 50 hours to exchange Li co-ordinated between layers of the synthesized Li-hectorite with $K^+$, $Ba^{2+}$, $Pb^{2+}$, $Zn^{2+}$, $Al^{3+}$, $Bi^{3+}$, and $Sb^{3+}$ respectively.

The ion-exchanged films were then dipped in distilled water for 24 hours and washed with water. The films were then dried in an atmosphere of a relative humidity of 60% at 20°C for 10 hours. The films ion-exchanged with K and Ba were further dried at 100°C for 2 hours; 200°C for 2 hours; 200°–350°C raising the temperature to 350°C for 1 hour; 350°–550°C raising the temperature to 550°C; for 1 hour and 550°C for 1 hour. The films ion-exchanged with Pb, Al, Zn, Bi and Sb were further dried at 100°C for 2 hours; and at 250°C for 2 hours.

The ion-exchange amount and the insulation resistance of the above prepared films were as follows:

| Exchange ion | Li amount remaining (%) | Insulation resistance |
| --- | --- | --- |
| K  | 0.05 | 2,000 MΩ |
| Ba | 0.05 | 2,000 MΩ |
| Pb | 0    | ∞ |
| Zn | 0.03 | 5,000 MΩ |
| Al | 0.03 | ∞ |
| Bi | 0    | ∞ |
| Sb | 0    | ∞ |

Films prepared in the same manner as the above procedure by using the synthesized Na-hectorite of Example 2 have substantially the same properties as those of the above films prepared by using the Li-hectorite of Example 1.

EXAMPLE 4

200 cc of a sol containing 3% of the Li-hectorite of Example 1 or Na-hectorite of Example 2 were poured into respective beakers, and to the beakers were added 20 g of $AgNO_3$; 25 g of $Pb(NO_3)_2$; 50 g of $Zn(NO_3)_2$—$6H_2O$; 25 g of $SnCl_2$—$2H_2O$; 140 g of $Al(NO_3)_3$—$9H_2O$; 25 g of $Bi(NO_3)_3$—$5H_2O$; and 20 g of $SbCl_3$ as ion-exchanging electrolytes. The respective ion-exchanges were carried out for 20 hours with vigorous stirring by a propeller to prevent the contents from cohering. After the ion-exchange, each of the ion-exchanged sols was decanted into a vacuum filter, and the filtrate was removed. The materials remained on the filter were washed with distilled water. The washed materials and 200 cc of distilled water were placed in the middle chamber or three chambers divided by porcelain diaphragm plates in an electrodialysis apparatus. Distilled water was placed in both side chamber, and graphite electrodes were respectively disposed by making the distance between the electrodes 15 cm. The electrodialysis was carried out for 30 minutes under a direct current of 100 V and 50 mA, and dissociated $Li^+$ and the remaining electrolytes were removed to obtain a sol having refined Li-hectorite or Na-hectorite uniformly dispersed therein. The sol was then dried and subjected to chemical analysis. The Li or Na amount remaining was in each case less than 0.05%.

EXAMPLE 5

Each colloid containing 10% of hectorite as prepared in Example 4 was coated on a glass cloth of 30 cm × 30 cm having a thickness of 0.05 mm which was closely adhered to a polyethylene plate by impregnating it with water. The thickness of the coating was made about 3 mm by the use of a glass rod, and the coating was dried in an atmosphere of relative humidity of 60% at 30°C for 10 hours. The coating was further dried in a drier at 100°C for 1 hour and at 200°C for 2 hours, and a hectorite-coated glass fiber film having a thickness of 0.15 mm was obtained. These films had almost infinite insulation resistance on the surface, and most of the films had a withstanding voltage of more than 2300 V/0.1 mm, the lowest value being 1800 V/0.1 mm.

EXAMPLE 6

A sol of Pb-hectorite as prepared in Example 4 was condensed until the water content became 20%. 50 g of the condensed Pb-hectorite sol was added to 300 cc of xylene solution, and was rapidly stirred for 10 minutes. The solution was further stirred by ultra-sonic waves of 28 KC for 30 minutes and the Pb-hectorite was uniformly dispersed in the xylene solution. To the Pb-hectorite-dispersed xylene solution were added 10 g of epoxy resin and 3 g of glass fiber having a length of 1 cm and a fiber diameter of 20 $\mu$, and the mixture was stirred by ultra-sonic waves for 20 minutes. The mixture was then coated on a fluoroplastic plate, and the thickness of the coating was made about 3 mm by the use of a glass rod. The coating was then dried in an atmosphere of relative humidity of 60% at 20°C for 5 hours, and further dried in a drier at 100°C for 30 minutes and at 150°C for 1 hour to obtain a film of 20 cm × 20 cm having a thickness of 0.2 mm. The above prepared film had a tensile strength of 7 kg/mm$^2$ and a withstanding voltage of 4 KV/0.1 mm.

EXAMPLE 7

200 g of a concentrated sol containing 30% of Al-hectorite as prepared in Example 4 were mixed with 40 cc of a sol containing 20% of alumina and 5 cc of 80% phosphoric acid solution, and the mixture was fully stirred to obtain a viscous material. The viscous material was coated on a steel plate of 15 cm × 15 cm having a thickness of 2 mm, and the thickness of the coating was made about 3 mm. The coating was then dried in a drier at 50°C for 2 hours, and further dried at 100°C for 1 hour to obtain a heat-resistant film having a thickness of 0.5 mm on the steel plate. This film on the steel plate was heated at 1,000°C for 1 hour, but the film did not peel off from the steel plate.

A viscous material prepared in the same manner as above by mixing 20% of silica gel in place of the alumina gel was coated on a copper plate of 15 cm × 15 cm having a thickness of 2 mm, and the coating was dried to obtain a film having a thickness of 0.5 mm. This film had the same heat-resistance as the film on the steel plate.

EXAMPLE 8

60 g of an aqueous mixture containing 65% of Li-hectorite as prepared in Example 1 were bathed in 300 cc of ethylamine in a beaker, and were stirred for 30 minutes to disperse in and react with ethylamine. The ethylamine was removed through a vacuum filter. The hectorite remaining on the filter was bathed in 150 cc of silicone oil, and was stirred by ultrasonic waves at 28 KC for 10 minutes. Consequently, the hectorite was swelled in the oil, and became gel-like. This product had excellent properties as a heat-resistant grease.

EXAMPLE 9

A sol of Li-hectorite as prepared in Example 1 was condensed until a gel containing 10% of Li-hectorite was obtained. To this gel were added glass fiber having a fiber length of about 5 cm and a diameter of 19 $\mu$ (100 g), crushed palm shell fiber having a fiber length of 5 cm (50 g), 200 mesh cristobalite (200 g) and 80% phosphoric acid solution (10 cc), and the mixture was stirred by a glass rod for 20 minutes. The mixture was heated and dried until the water content became 2%. The dried mixture was placed in a steel mold, and was press-molded under a pressure of 1,000 kg/cm$^2$ by an oil press to obtain a molded product of 30 × 30 × 120 mm. The molded product was dried at 100°C for 3 hours, and was then bathed in a KCl saturated solution for 100 hours to ion-exchange. The ion-exchanged product was then bathed in water for 24 hours to wash it, and the washed product was dried at 100°C for 3 hours. This product had a cutting-resistance of 600 kg/cm$^2$, and it was possible to process this product with a drill.

EXAMPLE 10

To 200 cc of a sol containing 2% of Li-hectorite as prepared in Example 1, was added 20 cc of 10% HCl solution, and the mixture was stirred by a propeller for 30 minutes. The mixture was filtered through a filter paper, and the hectorite remaining on the filter paper was washed by gradually dropping 300 cc of distilled water onto it. The washed hectorite was put into 150 cc of distilled water, and was stirred by ultra-sonic waves at 28 KC to disperse it. According to a substitution test with barium chloride, it was proved that hydrogen-hectorite was formed in the sol.

EXAMPLE 11

300 cc of a sol containing 2% of Na-hectorite as prepared in Example 2 was placed in the middle chamber of three chamber equally divided by mullite diaphragms in a glass tank of 20 cm × 20 cm × 23 cm. Distilled water was placed in both side chambers, and graphite electrodes of 3 cm × 1 cm × 20 cm were respectively disposed by making the distance between the electrodes 10 cm. 5 cc of 10% HCl solution was put into the middle chamber. Electrodialysis was carried out for 30 minutes by stirring the contents in the middle chamber under a direct current of 100 V and 70–100 mA while refreshing the distilled water in both side chambers. According to a substitution test with barium chloride, it was proved that hydrogen-hectorite was formed by the dialysis.

What we claim is:

1. A sol of ultra-fine particles of synthetic hectorite, prepared by swelling and cleaving Li-hectorite having the formula $Li_{1/3}Mg_{2/3}Li_{1/3}(Si_4O_{10})F_2$ or Na-hectorite having the formula $Na_{1/3}Mg_{2/3}Li_{1/3}(Si_4O_{10})F_2$ in water or an organic solvent, and ion-exchanging the Li or Na ions co-ordinated between the lattice layers of the hectorite with a non-hydratable cation selected from the group consisting of $K^+$, $Ag^+$, $Cu^+$, $Ba^{2+}$, $Pb^{2+}$, $Sn^{2+}$, $Zn^{2+}$, $Al^{3+}$, $Bi^{3+}$ and $Sb^{3+}$.

2. A heat-resistant and insulating film-like product prepared by spreading the sol of claim 1 on a flat surface, drying it to remove the water or organic solvent therefrom, and removing the film-like product from the flat surface.

3. A heat-resistant and insulating film-like product prepared by mixing the sol of claim 1 with a filler selected from the group consisting of organic fibers, inorganic fibers, ceramic minerals and mixtures thereof, spreading the thus-prepared mixture on a flat surface, drying it to remove the water or organic solvent therefrom and removing the film-like product from the flat surface.

4. A heat-resistant and insulating film-like composite product prepared by coating the sol of claim 1 onto a substrate selected from the group consisting of metals, ceramics and organic films and drying the sol to produce a composite heat-resistant insulating film-like product.

5. A heat-resistant and insulating film-like composite product prepared by mixing the sol of claim 1 with a filler selected from the group consisting of organic fibers, inorganic fibers, ceramic minerals and mixtures thereof, spreading the thus-prepared mixture onto a substrate selected from the group consisting of metals, ceramics and organic films and drying the mixture to produce the film-like composite product.

\* \* \* \* \*